United States Patent
Chaumat et al.

(10) Patent No.: US 9,713,860 B2
(45) Date of Patent: Jul. 25, 2017

(54) COMPOSITIONS FOR JOINING AND ASSEMBLING PARTS MADE OF SIC-BASED MATERIALS

(71) Applicant: COMMISSARIAT A L'ENERGIE ATOMIQUE ET AUX ENERGIES ALTERNATIVES, Paris (FR)

(72) Inventors: Valérie Chaumat, Saint-Paul-de-Varces (FR); Jean-Francois Henne, Bethune (FR); Nadia Miloud-Ali, Meylan (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 14/201,487

(22) Filed: Mar. 7, 2014

(65) Prior Publication Data

US 2014/0186102 A1    Jul. 3, 2014

Related U.S. Application Data

(62) Division of application No. 13/635,353, filed as application No. PCT/EP2011/053690 on Mar. 11, 2011, now Pat. No. 8,678,269.

(30) Foreign Application Priority Data

Mar. 16, 2010 (FR) ..................... 10 51870

(51) Int. Cl.
*B23K 31/02* (2006.01)
*B23K 35/36* (2006.01)
(Continued)

(52) U.S. Cl.
CPC ............ *B23K 35/36* (2013.01); *B23K 1/0008* (2013.01); *B23K 1/19* (2013.01); *B23K 1/20* (2013.01);
(Continued)

(58) Field of Classification Search
None
See application file for complete search history.

(56) References Cited

U.S. PATENT DOCUMENTS 3,033,676 A * 5/1962 Cox ................................. 420/25
3,813,759 A   6/1974 Heap et al.
(Continued)

FOREIGN PATENT DOCUMENTS

EP    1 873 846 A1    1/2008
WO   2005/083134 A1   9/2005

OTHER PUBLICATIONS

Fleischauer et al. "Simple Model for the Capacity of Amorphous Silicon-Aluminum-Transition Metal Negative Electrode Materials" (hereafter Fleischauer), pp. A1201-A1205, 2006.*

(Continued)

*Primary Examiner* — Kiley Stoner
(74) *Attorney, Agent, or Firm* — Knobbe, Martens, Olson & Bear, LLP

(57) ABSTRACT

A method for joining, assembling, at least two parts made of silicon carbide-based materials by non-reactive brazing is provided. According to the method, the parts are contacted with a non-reactive brazing composition, the assembly formed by the parts and the brazing composition is heated to a brazing temperature sufficient to melt the brazing composition totally or at least partly, and the parts and brazing composition are cooled to that, after solidification of the brazing composition, a moderately refractory joint is formed; wherein the non-reactive brazing composition is an alloy comprising, in atomic percentages, 45% to 65% silicon, 28% to 45% nickel and 5% to 15% aluminum. A brazing composition as defined above is provided. A brazing paste, suspension comprising a powder of said brazing (Continued)

composition and an organic binder as well as a joint and assembly obtained the foregoing method are also provided.

38 Claims, 3 Drawing Sheets

(51) Int. Cl.
| | | |
|---|---|---|
| *B23K 1/00* | (2006.01) | |
| *B23K 1/19* | (2006.01) | |
| *B23K 1/20* | (2006.01) | |
| *B23K 35/02* | (2006.01) | |
| *B23K 35/30* | (2006.01) | |
| *C04B 37/00* | (2006.01) | |
| *B23K 35/24* | (2006.01) | |

(52) U.S. Cl.
CPC ............ *B23K 35/02* (2013.01); *B23K 35/025* (2013.01); *B23K 35/24* (2013.01); *B23K 35/30* (2013.01); *C04B 37/005* (2013.01); *C04B 37/006* (2013.01); *C04B 2235/3826* (2013.01); *C04B 2235/422* (2013.01); *C04B 2235/5244* (2013.01); *C04B 2235/5248* (2013.01); *C04B 2235/5256* (2013.01); *C04B 2235/616* (2013.01); *C04B 2235/6562* (2013.01); *C04B 2235/6565* (2013.01); *C04B 2235/6567* (2013.01); *C04B 2235/6581* (2013.01); *C04B 2235/96* (2013.01); *C04B 2237/08* (2013.01); *C04B 2237/123* (2013.01); *C04B 2237/128* (2013.01); *C04B 2237/16* (2013.01); *C04B 2237/365* (2013.01); *C04B 2237/38* (2013.01); *C04B 2237/52* (2013.01); *C04B 2237/597* (2013.01); *C04B 2237/708* (2013.01); *C04B 2237/86* (2013.01); *Y10T 403/479* (2015.01)

(56) References Cited

U.S. PATENT DOCUMENTS

| | | | |
|---|---|---|---|
| 4,423,122 A * | 12/1983 | Iacovangelo et al. | ........ 429/474 |
| 4,990,234 A | 2/1991 | Szczyrbowski et al. | |
| 5,447,683 A | 9/1995 | Montgomery et al. | |
| 5,714,785 A | 2/1998 | Jiang | |
| 5,975,407 A | 11/1999 | Gasse et al. | |
| 6,221,499 B1 | 4/2001 | Gasse et al. | |
| 6,730,434 B1 * | 5/2004 | Kawakami et al. | ........ 429/218.1 |
| 6,793,873 B2 * | 9/2004 | Gadow et al. | ................ 264/646 |
| 7,318,547 B2 | 1/2008 | Gasse | |
| 8,177,497 B2 | 5/2012 | Benoit et al. | |
| 2002/0006552 A1 * | 1/2002 | Ishida et al. | .................. 429/303 |
| 2003/0038166 A1 | 2/2003 | Gasse | |
| 2009/0148743 A1 * | 6/2009 | Day et al. | ........................ 429/33 |
| 2011/0033747 A1 * | 2/2011 | Phillips et al. | ................ 429/212 |

OTHER PUBLICATIONS

International Search Report issued on Jun. 10, 2011 for International Application No. PCT/EP2011/053690.
Kalogeropoulou, et al., "Relationship between wettability and Reactivity in Fe/SiC System", Acta metall, mater, vol. 43, No. 3, pp. 907-912, 1995.
McDermid, et al., "Thermodynamic Brazing Alloy Design for Joining Silicon Carbide", J. Am. Ceram. Soc., 74 (8), pp. 1855-1860, 1991.
Preliminary French Report dated Oct. 6, 2010 for French Application No. 1051870.
Rado, et al., "Wetting and Bonding of Ni-Si Alloys on Silicon Carbide", Acta mater., vol. 47, No. 2, pp. 461-473, 1999.
Richter, et al., "The Al—Ni—Si phase diagram between 1 and 33.3 at.% Ni", Intermetallics, 11, 2003, pp. 101-109.
Kimita et al. Enhanced densification of combustion synthesised Ni—Al intermetallic compound by Si addition (2003). pp. 947-952.
Richter, et al., The Al—Ni—Si phase diagram. Part II: phase equilibria between 33.3 and 66.7 at. % Ni; Intermetallics, 12, 2004, pp. 545-554.

\* cited by examiner

COMPOSITIONS FOR JOINING AND ASSEMBLING PARTS MADE OF SIC-BASED MATERIALS

CROSS REFERENCE TO RELATED APPLICATIONS

This application is a divisional application of U.S. application Ser. No. 13/635,353, filed Sep. 20, 2012 which is the U.S. National Phase of International Application No. PCT/EP2011/053690, filed Mar. 11, 2011, designating the U.S. and published as WO 2011/113758 on Sep. 22, 2011 which claims the benefit of French Patent Application No. 10 51870 filed Mar. 16, 2010.

TECHNICAL FIELD

The present invention relates to a method for joining, assembling, parts made of silicon carbide-based materials by non-reactive brazing with a non-reactive brazing composition, for the purpose in particular of preparing components entirely based on silicon carbide.

The joining, assembling, method according to the invention is generally implemented at a temperature not exceeding 1150° C., preferably between 1040° C. and 1150° C.

The invention further relates to brazing compositions and to a joint and assembly obtained by this method, an assembly whose maximum temperature of use of the assembled component is generally between 950° C. and 980° C.

By <<silicon carbide-based>> materials is generally meant a material whose SiC content is equal to or higher than 50% by weight, preferably equal to or higher than 80% by weight, further preferably it is 100% by weight, in this latter case it can be said that the material consists or is composed of silicon carbide.

The silicon carbide may be in the form of fibres of silicon carbide or of a powder of silicon carbide sintered or bonded via a ceramic binder.

These silicon carbide-based materials may notably be pure silicon carbide such as pure α (α-SiC) or pure β (β-SiC) silicon carbide, substrates made of silicon carbide infiltrated with silicon (SiSiC), or SiC-based composite materials such as composite materials with silicon carbide fibres and/or matrix.

The technical field of the invention can be defined as the brazing at an implementation temperature (temperature equivalent to the brazing plateau, hold, temperature) generally not exceeding 1150° C., preferably at a temperature of 1040° C. to 1150° C.

The assemblies concerned by the present invention are therefore generally considered to be <<moderately refractory>> i.e. the maximum temperature of use of these assemblies is generally of the order of 950° C. to 980° C.

These assemblies can enter into the production of components of complex shapes requiring good mechanical strength between the silicon carbide-based substrates and optionally a satisfactory seal either side of the joint.

BACKGROUND

It is known that it is difficult to fabricate parts of large size made of ceramic, in particular made of SiC. The tolerances after sintering the primary components made of silicon carbide of large size are ill controlled and the machining of these components is unacceptable for cost-related reasons.

In addition, and for the same reasons, it is generally difficult to fabricate parts of complex shape with silicon-based compounds such as silicon carbide.

It is therefore often preferable to fabricate parts or structures of large size and/or of complex shape from elements in ceramic of simple shape and/or of small size, and then to assemble these elements to form the final structure.

Said technique is particularly necessary for fabricating structures of heat exchanger type and structural components in silicon carbide having a temperature of use possibly reaching up to for example 900° C., even 1000° C.

On account of the high temperatures, close to 900° C. to 1000° C. for example, used in applications of ceramics such as silicon carbide, the joining of these ceramics by bonding with organic adhesives is excluded since the temperatures of use of this type of assembly cannot exceed 200° C. at the most.

Purely mechanical assemblies, for example by stapling or screwing, only ensure partial, random contact between the parts. The assemblies thus obtained cannot be leak tight. The mechanical strength is only ensured by the staples and screws, which is limited. To ensure good mechanical strength of the joint, it is essential to create good adhesion between the parts to be joined, which is not possible with screws or staples.

Additionally, conventional joining techniques by welding having recourse to an energy beam with or without a supply of metal (TIG, electron or laser welding) and involving the partial melting of the parts to be joined cannot be used for assembling ceramics since it is not possible to melt a substrate or a part in ceramic, and in particular since silicon carbide decomposes before melting.

Usual techniques for obtaining refractory assemblies of ceramics are solid phase diffusion bonding and joining by sintering or co-sintering.

For assembly by diffusion bonding, a pressure is applied at high temperature between the interfaces to allow atomic inter-diffusion between the two substrates. The temperature must always remain lower than the melting point of the least refractory material, and there is therefore no liquid phase in the system. This type of joining is obtained either under a press in single direction, or in an isostatic chamber. Diffusion bonding is well adapted for the joining of two metal alloys and very little adapted for the joining of ceramic materials, since the atoms forming the ceramic scarcely diffuse at the joint. In addition, the method is prohibitive from a mechanical viewpoint since it requires placing under compression porous, fragile substrates and materials such as silicon carbide composites which risk being highly damaged under this mechanical compressive loading.

The joining by sintering or co-sintering of parts made of SiC also requires high pressures but in addition high temperatures and long hold times since this process is based on the principle of inter-diffusion between the SiC elements.

In other words, solid phase diffusion bonding and joining by sintering have the disadvantage of being restrictive from an implementation standpoint since:

for solid phase diffusion bonding, the shape of the parts must remain simple if uniaxial pressing is used, or else it requires complex tooling and preparation for example entailing the fabrication of a jacket, vacuum sealing, hot isostatic pressing, final machining of the jacket if HIP is used (Hot Isostatic Pressing).

for co-sintering or joining by sintering the problems remain the same (shape of the parts, complex implementation) with, in addition, the need to control the sintering of a filler powder to be inserted between the two materials to be joined.

these two techniques additionally require the use of long hold times (one to several hours) at high temperature since the processes used have recourse to solid state diffusion.

It follows from the above, and to summarize, that in order to guarantee good mechanical strength in particular and optionally satisfactory sealing of the assembly, only those processes using a liquid phase such as brazing can be envisaged.

Brazing is a low-cost technique, easy to perform and is the most commonly used. Parts of complex shape can be prepared using brazing, and brazing operations are limited to placing between the parts to be joined, or in the vicinity of the joint between the two parts, a filler alloy called a braze alloy and melting this alloy which is capable of wetting and spreading over the interfaces to be joined, filling the joint between the parts. After cooling the brazing alloy solidifies ensuring the cohesion of the assembly.

Most brazing compositions for parts in silicon carbide-based materials are insufficiently refractory. These are generally brazing compositions formed by metal alloys having a melting point that is lower even much lower than 1000° C. Said melting temperature is distinctly insufficient for applications at temperatures in the region of 900° C. or 1000° C., for example from 950° C. to 980° C.

Also, most chemical elements which form part of these metal brazing compositions are highly reactive with silicon carbide on and after 500° C. and lead to fragile compounds.

As a result, for brazing at higher temperatures generally above 1000° C., said brazing compositions or braze alloys would chemically attack the silicon carbide-based materials not only during the brazing operation but also during functional use by solid state diffusion.

It is also pointed out that the least reactive alloys are also the least refractory, such as the AgCuTi alloy for example with Ag—Cu matrix and active Ti element in low concentration. For the applications more particularly concerned by the invention, which are those of moderately refractory assemblies having a temperature of use of generally up to 950° C., even 980° C., all the reactive brazing compositions chiefly containing silver, or silver-copper, copper, nickel, iron or cobalt, platinum, palladium or gold are therefore to be excluded on account of their strong reactivity with silicon carbide.

Formulations of brazing alloys, brazing compositions, that are more refractory and with high silicon content are presented in documents [1, 2, 3]. These brazing compositions have scarcely reactive behaviour, even non-reactive, with SiC which prevents the formation of fragile compounds. This criterion of non-reactivity or very low reactivity is not a sufficient condition however for guaranteeing good mechanical strength of the brazed joints. In the literature, the yield strength values of binary silicon-based brazing alloys are most variable in relation to the second element taking part in the silicon-based non-reactive brazing composition.

For example, for the non-reactive Fe—Si system (45% Fe-55% Si by weight), document [3] mentions an extremely low ultimate tensile strength of the order of 2 MPa, despite the non-reactivity of this composition indicated in document [4], whilst for the Cr—Si system (25% Cr-75% Si by weight), this same document [3] gives a higher value of the order of 12 MPa.

For a non-reactive Co—Si alloy (90% Si-10% Co by weight), document [1] mentions a value of about 100 MPa under compression/shear.

The properties, in particular mechanical properties, of a silicon-based brazing composition are fully unpredictable and can absolutely not be inferred from the mechanical properties of already known Si-based brazing compositions, even if of very close type.

In other words, when it is sought to prepare a silicon-based brazing composition in particular for brazing parts in SiC, it is absolutely not possible to refer to the mechanical properties which may be acceptable exhibited by other known Si-based brazing compositions, since any modification however small of a Si-based brazing composition whether concerning the type of the metal(s) brazed with the silicon or the proportions thereof, may lead to unpredictable, unexpected even major changes in the properties of the composition and in particular its mechanical properties.

To conclude, it is not possible to predict the mechanics of a given binary Si—X system where X is a metal, and even less so the mechanics of a said system as a function of the proportions of X. For all the more reason, it is impossible to predict the mechanics of a more complex system such as a ternary Si—X—Z system where X and Z are metals.

The brazing temperatures of the brazing compositions in documents [1, 2] and [3] are generally higher than 1300° C. These brazing temperature are for example 1355° C. for the Ti—Si composition (22-78% by weight), 1355° C. for the Cr—Si composition (25-75% by weight), 1400° C. to 1450° C. for the Co—Si composition, and 1750° C. for the $Ru_2Si_3$ composition.

The efficacy of this joining method requires brazing temperatures higher than 1300° C. for thermodynamic destabilization of the passivating silicon oxide layers which occur spontaneously on the silicon carbide surfaces, since these silicon oxide layers are detrimental to wetting by the brazing composition, even if brazing is conducted in a vacuum.

Therefore the above-mentioned brazing alloys with high silicon content and used at a temperature higher than 1300° C. are not suitable for the brazing of substrates in silicon carbide-based materials whose properties are degraded after exposure to 1300° C., even more so for those which degrade at 1150° C., even 1100° C. or lower. This is notably the case with some SiC/SiC composites which degrade at above 1300° C., even 1150° C., and even at above 1100° C. such as the CMC examined in the Examples which degrades on and after 1100° C.

It is true that document [3] in Example 2 presents a Ni—Si brazing composition (65% Ni-35 Si % by weight, i.e. 47 atomic % Ni-53 atomic % Si) which can be brazed at 1120° C., for 16 hours. This brazing temperature is slightly higher than the preferred brazing temperature used in the invention which is 1100° C., but it uses a very long brazing hold time. However, the mechanical strength of the joint obtained with this composition (ultimate tensile strength of 375 p.s.i.—i.e. about 2.6 MPa) is very low despite the non-reactivity of this composition mentioned in document [5]. This mechanical strength is insufficient for numerous applications and in particular the main applications concerned herein, despite the low reactivity of this brazing composition with SiC.

It is also to be pointed out that this Ni—Si brazing alloy (65 wt %-35 wt %) has a melt onset temperature of 966° C. (eutectic at 966°) which is not suitable for applications at 950° C.-980° C.

For higher Si contents, it is specified in document [5] that Ni—Si brazing alloys are not reactive, but no mechanical data is provided. The work described in document [5] focuses on the study of wetting angles and the work of adhesion (thermodynamic adhesion at a solid/liquid interface, this adhesion is defined by the work needed for reversible separation of a solid/liquid interface into two solid/vapour and liquid/vapour surfaces. Finally, it is noted that for these Ni—Si brazing alloys, the range between liquidus and solidus is very extensive with, as already mentioned above, the onset of melting on and after 966° C. (for Ni 66% by weight, but also for close-lying contents due to the presence of an eutectic at 966° C.) which limits application temperatures to below 900° C.

Document [6] mentions a brazing alloy Ni-13.4 Cr-40 Si (atomic %) whose melting point is 1150° C. and which is used at a brazing temperature of 1200° C. The authors did not conduct mechanical characterization on the brazed joints and only metallurgical characteristics are given which indicate non-reactivity.

No mechanical test result on this alloy is provided which means that good mechanical strength of the brazing can in no way be guaranteed.

Document [2] proposes (Example 3) a Pt—Si alloy which is brazed at 1200° C. The Pt content of this brazing composition is very high (77 weight % Pt), which leads to a very costly process. This disadvantage is prohibitive for the obtaining of large-size brazed parts.

At all events, 1200° C. is a temperature that is too <<refractory>> for the applications concerned by the present invention.

Finally document [7] presents brazing alloys having a Si content of less than 50 weight %, preferably 10 to 45 weight %, and with the addition of at least 2 elements chosen from the following group: Li, Be, B, Na, Mg, P, Sc, Ti, V, Cr, Mn, Fe, Co, Zn, Ga, Ge, As, Rb, Y, Sb, Te, Cs, Pr, Nd, Ta, W and Ti. In this group of elements at least one thereof is preferably a metal chosen from among Fe, Cr, Co, V, Zn, Ti and Y. Neither nickel nor aluminium are cited.

The examples in document [7] describe ternary brazing compositions: Si—Cr—Co (11:38.5:50.5% by weight); Si—Cr—Co (40:26:34% by weight); Si—Fe—Cr (17.2:17.5: 65.3% by weight); and Si—Fe—Co (20:20:60% by weight); and the brazing thereof at temperatures respectively of 1230° C., 1235° C., 1460° C. and 1500° C.

The brazing compositions in document [7] never contain the nickel element or aluminium element.

Regarding the brazing compositions having brazing temperatures lower than 1300° C., it is simply mentioned that a <<strong>> bond is obtained and no mechanical test is provided to prove that good mechanical strength of the joints is effectively obtained. Also, the low reactivity of the SiC/ brazing filler is neither mentioned nor referred to.

In the light of the foregoing there is therefore a need, not yet met, for a method with which it is possible to obtain the joining by brazing of parts in silicon carbide-based materials, more specifically of moderately refractory substrates in silicon carbide, which ensures satisfactory mechanical strength of the assembly at between 20° C. and 950° C. even 980° C., in particular above 500° C. and up to 950° C. even 980° C., and optionally also sealing of the joint.

This method must allow the use in particular of brazing temperatures equal to or lower than 1150° C. and preferably of 1100° C. which is a temperature that it is absolutely essential not to exceed for some SiC-based substrates, parts to be joined.

It is effectively essential that the parts, substrates maintain their full integrity and initial performance levels after the joining operation by brazing.

There is therefore a need for a brazing method using brazing compositions which allows the desired temperatures of use to be reached namely up to 950° C. even 980° C., whilst avoiding the subjecting of the parts, substrates in silicon carbide-based materials to temperature ranges which could deteriorate these materials.

In other words, there is a need for a brazing method which allows moderately refractory brazed joints to be obtained (with a temperature of use of up to about 950° C. even 980° C.) using brazing cycles generally not exceeding a limit temperature defined between 1040° C. and 1150° C., in particular of 1100° C. depending on the SiC-based material to be joined.

Numerous silicon carbide-based materials, in particular some composites, are irreversibly deteriorated over and above 1100° C.: this is particularly the case with some composites formed of a SiC matrix and SiC fibres such as the composite available from SNECMA Propulsion Solide under the trade name Cerasep A40C®.

In addition, the holding time of the brazing plateau at a temperature equal to or lower than 1150° C., for example of 1100° C., must preferably be from one or a few minutes to two or three hours at most to avoid degradation of the composite.

On the other hand, pure silicon carbide withstands brazing at 1450° C.

In other words, there is a need for a brazing method and composition, brazing alloy, firstly allowing the use of the full refractory potential of the silicon carbide-based substrates at temperatures of use of up to about 950° C. even 980° C., and secondly allowing brazing at a brazing temperature lower than the degradation temperature of the substrates with a brazing temperature equal to or lower than 1150° C., preferably in the range between 1040° C. and 1150° C., more preferably lower than 1100° C., further preferably in the range between 1080° C. and 1100° C.

There is also a need for a method allowing brazing to be conducted at a temperature equal to or lower than 1150° C., preferably between 1040° C. and 1150° C., of a moderately refractory assembly (temperature of use generally between 950° C. and 980° C.), of parts in silicon carbide-based materials irrespective of their shape and/or their size.

In particular, there is a need for a brazing method and for the associated brazing composition, allowing the brazing to be conducted at a temperature lower than 1150° C., preferably between 1040° C. and 1150° C., of silicon carbide-based parts of large size and/or of complex geometry notably having large surface areas to be brazed.

In addition, none of the methods and compositions in the prior art simultaneously meets the following criteria evidenced by the inventors which are fundamental for preparing structural components in SiC entailing moderately refractory joints:

1) the brazing composition must allow a strong bond to be obtained between the two parts in silicon carbide-based material, which necessitates a non-reactive brazing composition i.e. chemically compatible with silicon carbide, and which does not form fragile compounds therewith. However, the non-reactivity does not guarantee the forming of a strong bond since this remains unpredictable. Non-reactivity is a condition for obtaining a strong bond but it is not sufficient. For example, the Fe—Si system cited in the literature [3] is non-reactive but its mechanical strength is very weak;

2) the brazing composition must obtain good wetting of the silicon carbide and good adhesion thereto;

3) the brazing composition must be compatible with all heating devices in particular rapid and/or localised heating devices;

4) the brazing composition must allow the formation of joints having good mechanical strength;

5) the brazing composition must be formed of a limited number of elements to facilitate the preparation and implementation thereof;

6) the brazing composition must not contain costly elements such as precious metals.

Finally, the method and associated brazing composition must allow the brazing, the joining of any type of silicon carbide-based material, and must be easily adaptable to any specific silicon carbon-based ceramic.

The objective of the invention is therefore to provide a method for the joining by brazing of parts or components in silicon carbide-based materials which inter alia meets the above-cited needs, which inter alia fulfils all the requirements and criteria set forth above, which eliminates the disadvantages, defects, limitations encountered with prior art methods and which solves the problems of the prior art methods.

The objective of the invention is notably to provide a method for the joining by brazing of parts or components in silicon carbide-based materials which allows satisfactory mechanical strength of the assembly to be obtained above 500° C. and up to 950° C., even 980° C., which uses brazing temperatures equal to or lower than 1150° C., preferably in the range between 1040° C. and 1150° C., and more preferably equal to or lower than 1100° C., for example from 1080° C. to 1100° C., and which optionally allows the obtaining of joints having an excellent seal.

DISCLOSURE OF CERTAIN INVENTIVE ASPECTS

This goal and others are achieved according to the invention by a method for joining, assembling, at least two parts made of silicon carbide-based materials by non-reactive brazing, wherein the parts are contacted with a non-reactive brazing composition, the assembly formed by the parts and the brazing composition is heated to a brazing temperature sufficient to melt the brazing composition totally or at least partly, and the parts and the brazing composition are cooled so that, after solidification of the brazing composition, a moderately refractory joint is formed; wherein the non-reactive brazing composition is an alloy comprising in atomic percentages 45% to 65% silicon, 28% to 45% nickel, and 5% to 15% aluminium.

Advantageously, the alloy is a ternary alloy consisting, in atomic percentages, of 45% to 65% silicon, 28% to 45% nickel, and 5% to 15% aluminium.

The melting of the brazing composition is generally considered to be total when it is in the liquid state at a temperature equal to or higher than the liquidus. The melting of the brazing composition is generally considered to be partial when it is in a state that can be qualified as semi-solid, viscous, softened, at a temperature lying between the solidus and the liquidus.

In general, brazing is conducted at a brazing temperature equal to or lower than 1150° C., preferably the brazing temperature is from 1040° C. to 1150° C., more preferably from 1080° C. to 1100° C.

By moderately refractory joint is generally meant that this joint is generally capable of withstanding operating temperatures of up to 950° C. even 980° C.

The method of the invention, which is a brazing method at a temperature from 1040° C. to 1150° C., more preferably from 1080° C. to 1100° C. and using a specific brazing composition, has never been described in the prior art.

In particular, the specific brazing composition used according to the invention which surprisingly allows the brazing at a temperature from 1040° C. to 1150° C., preferably from 1080° C. to 1100° C., of parts made of silicon carbide-based materials is in no way mentioned in the above-cited prior art documents.

For example, document [7] does not mention either nickel or aluminium in the list of 27 elements among which at least two must be chosen to form a brazing composition with silicon, silicon at all times being present to a proportion of less than 50% by mass. In this list Fe, Cr, Co, V, Zn, Ti and Y are preferred, and for all the more reason neither nickel nor aluminium are cited among the preferred elements.

None of the particularly preferred brazing alloys of this document which are alloys of silicon, chromium and cobalt, alloys of silicon, chromium and iron, and alloys of silicon, iron and cobalt, and none of the brazing compositions exemplified in this document contain either aluminium or nickel.

The brazing compositions in the Examples given in document [7] are limited to ternary SiFeCo, SiFeCr, SiCrCo systems having a Si content of less than 40% by mass. These compositions contain neither aluminium nor nickel and globally contain a much reduced number of elements compared with the list of 27 possible addition elements.

Document [7] does not provide any indication possibly leading to the choice of aluminium and nickel, and moreover no indication regarding a specific content thereof for preparing a ternary braze alloy compatible with SiC and ensuring the brazing of SiC-based parts at a temperature from 1040° C. to 1150° C., preferably from 1080° C. to 1100° C., and the effective joining of these parts.

The method of the invention fulfils the needs, meets all the requirements and criteria mentioned above and does not have the disadvantages of the prior art methods.

In particular, for the first time, the method of the invention allows the preparation of moderately refractory assemblies i.e. having a temperature of use of up to 950° C., even 980° C., of parts made of silicon carbide-based materials irrespective of their geometry, even very complex, and/or their size.

The method of the invention in all cases particularly ensures good filling of the joint with the brazing composition, excellent mechanical strength of the assembly at ambient and hot temperature in particular above 500° C. and up to 950° C.-980° C., and optionally very good imperviousness, leak tightness of the joint.

The method of the invention is additionally simple, reliable, easy to implement and overall of low cost.

In other words, the multiple advantages and surprising effects of the invention can be enumerated as follows, this enumeration not to be construed as limiting:

in relation to the composition of the chosen brazing alloy, several brazing temperatures are possible between 1040° C. and 1150° C. and are therefore able to meet different specifications;

the assembly obtained with the invention allows to ensure a good mechanical adhesion between the silicon carbide-based substrates even at maximum temperatures of use of more than 500° C. and possibly reaching 950°

C., even 980° C. for example. Ruptures occur in "cohesive" mode i.e. cracks occur in the silicon carbide substrates and not at the brazed joint;

the brazing temperature is equal to or lower than 1150° C., preferably between 1080° C. and 1100° C.; it is therefore possible with the method of the invention to join silicon carbide-based parts, substrates which cannot withstand temperatures of more than 1150° C., such as composite parts, substrates with a ceramic matrix e.g. Cerasep A40C®. In other words, with the method of the invention it is possible perform the brazing of SiC-based parts which degrade, deteriorate, on and after 1150° C., even 1100° C. Evidently, the method of the invention applies to pure or near-pure SiC, for example sintered SiC (in general sintered SiC contains sintering additives and is therefore not perfectly pure) for which brazing temperatures higher than 1300° C. can be used, but it also applies to less stable materials using brazing compositions adapted to these less heat-stable materials;

surprisingly, despite the brazing temperature equal to or lower than 1150° C., preferably from 1040° C. to 1150° C., more preferably from 1080 to 1100° C. used in the method of the invention, excellent wetting of the brazing composition, of the braze alloy of the invention on the surfaces of the silicon carbide substrates, parts to be joined has been ascertained. Therefore, by means of this good wetting of the surfaces it is possible according to the invention to conduct capillary brazing since the brazing composition of the invention is capable alone of filling the joint between the parts during the brazing operation for joints of a few microns to a few tens of microns, but also for thicker joints whose thickness may reach 500 µm. Capillary brazing with reinforcements e.g. particles or fibres in the joint, allows joints to be produced having a thickness of more than 500 µm and possibly even reaching a few millimeters;

non-reactivity of the braze alloy with the silicon carbide-based substrates was observed on the scale of scanning electron microscopy. There are no complex, porous weakening zones at the interface;

the brazing obtained with the method of the invention is reversible. It is therefore possible to disjoin, separate the assembled parts, substrates for example for the repair thereof by melting the brazing alloy in a furnace during a second melting operation of this braze alloy, without deteriorating the parts, substrates. The parts, substrates can also be separated by chemical attack. In other words, the method of the invention allows the repair of joined parts made of silicon carbide material. This means that these parts can be subjected to a second brazing cycle if needed for the purpose of repair without deteriorating the properties of the joints. This capacity for repair is possible due to the non-reactivity or scarce reactivity of the braze alloys used in the invention with silicon carbide;

another remarkable property obtained with the method of the invention is the homogeneity of the joint obtained after brazing and the very good mechanical behaviour of the joints formed;

it is not necessary in the method of the invention to metallize the parts, substrates made of SiC materials with the brazing composition before the brazing operation at a temperature equal to or lower than 1150° C., since the joints are well filled with the brazing composition of the invention, even in capillary configuration;

it is further not necessary in the method of the invention to deposit carbon on the parts, substrates made of SiC-based materials before the brazing operation at a temperature in particular lower than 1150° C. The wetting kinematics are rapid and the wetting angle is very good (a wetting angle of 50° is obtained after 5 minutes at 1100° C. and an angle of 30° is obtained after 30 minutes at 1100° C.—cf. Examples 2 and 1) and the joints are well filled with the brazing composition of the invention, even in capillary configuration;

the brazing compositions of the invention do not contain any precious chemical element, in particular no metals from the platinum or rhodium family, which limits their cost and the cost of the method in which they are used compared with numerous prior art compositions;

the brazed joints obtained with the method of the invention are generally impervious, leak tight. The method of the invention is therefore adapted for sealing operations which must withstand maximum temperatures of between 950° C. and 980° C. depending on the brazing alloy composition.

As already mentioned above, the behaviour of the brazing compositions, more particularly for brazing SiC, is extremely unpredictable and cannot under any circumstance be inferred from the behaviour of like brazing compositions.

Advantageously, the brazing composition of the invention may comprise, preferably be composed (consist) of, 60% to 55% silicon, 30% to 34% nickel and 11% to 9% aluminium in atomic percentages.

The preferred composition of the invention comprises, preferably is composed (consists) of, 57.5±1% silicon, 32.5±1% Ni and 10±0.5% Al, in atomic percentages.

This preferred composition has a solidus temperature of 1030° C. and a liquidus temperature of 1060° C.

The different brazing compositions defined by the advantageous percentages specified above are neither described nor suggested in the prior art.

The wetting of SiC-based substrates by the SiNiAl alloy (in particular for compositions in the preferred range between 60 and 55 atomic % Si, 30 and 34 atomic % Ni and 11 and 9 atomic % Al) is good since, as already indicated above, wetting angles of the order of 50° and 30° are respectively obtained after 5 minutes and 30 minutes at 1100° C. in a graphite furnace (cf. Examples 1 and 2). There is no need to deposit carbon on the silicon carbide in order to obtain a small stationary angle of the order of 30°.

Compression/shear tests were conducted on SiC/NiSiAl/SiC joints (cf. Example 3) and the breaking stress values were high with an average of 48 MPa (for the five test pieces the values obtained were the following: 33 MPa, 67 MPa, 35 MPa, 53 MPa and 54 MPa). Breaking occurred in the SiC which is characteristic of strong bonds between the braze alloy and the substrate.

Advantageously, prior to contacting the parts with the brazing composition, an addition, supply of a a reinforcement is carried out, in the brazing composition, and/or on at least one of the surfaces to be joined, assembled, of at least one of the parts to be assembled, joined, and/or in the vicinity of at least one of the surfaces to be joined, assembled, of at least one of the parts to be assembled, joined, and/or between the surfaces to be joined, assembled, of the parts to be assembled, joined.

This reinforcement may be made of a material chosen from among ceramics such as SiC and C.

This reinforcement may be in the form of particle e.g. of a powder; of fibres; of non-woven fabric; of woven fabric; of a felt; of a foam.

The adding of the reinforcement may be conducted in an amount of 50% by volume at the most, preferably from 1 to 49% by volume, more preferably 5 to 49% by volume, relative to the volume of the brazing composition.

Advantageously, when the reinforcement is in the form of particles or fibres, these particles or these fibres may be placed in suspension in an organic binder to obtain a suspension, slurry, or paste of reinforcing particles or fibres, and at least one surface to be joined, assembled, of at least one of the parts to be assembled, joined, may be coated with the suspension, slurry, or paste of reinforcing particles or fibres.

Advantageously, prior to the addition, supply of the reinforcement in the brazing composition and/or on at least one of the surfaces to be joined, assembled, of at least one of the parts to be assembled, joined, the reinforcement is optionally subjected to a heat treatment at a temperature generally from 1300° C. to 1500° C. e.g. 1400° C., for a time generally from 2 to 4 hours, for example 3 hours, under a high vacuum, then the reinforcement is optionally stored in an inert atmosphere e.g. in an argon atmosphere, for example if it is not used on the same day.

This heat treatment notably applies to SiC reinforcements, in particular in fibres or particles form, since SiC oxidizes at ambient temperature with the formation of silica, which is not the case with carbon reinforcements.

More generally, this heat treatment may prove to be necessary when the reinforcements to be used, in particular in powder form, are highly oxidized.

Advantageously in the method of the invention it is possible to form a brazing composition powder, to place this powder in suspension in an organic binder so as to obtain a suspension, slurry or paste of brazing composition, and to coat at least one surface of at least one of the parts to be joined, assembled, with the suspension, slurry, or paste of brazing composition obtained.

For example, it is possible to coat at least one surface to be joined, assembled, of at least one of the parts to be assembled, joined, with the suspension, slurry or paste of brazing composition, then to place in contact the surfaces to be assembled, joined, of the parts to be joined, assembled, so that the suspension, slurry, or paste of brazing composition is inserted between these surfaces.

Or else it is possible to place in contact the surfaces to be joined, assembled, of the parts to be joined, assembled by leaving an offset between them so as to create a free surface able to receive the suspension or paste of brazing composition in the vicinity of the joint formed by the surfaces to be joined, assembled, of the parts to be assembled, joined, then the suspension or paste of brazing composition may be deposited on this free surface for example in the form of a bead.

In this latter embodiment, the joint formed by the surfaces to be joined, assembled, of the parts to be joined, assembled can advantageously be occupied by a reinforcement which also preferably covers said free surface and on which the suspension or paste of brazing composition is deposited.

Prior to contacting with the brazing composition, the depositing of carbon on at least one of the surfaces of the parts to be assembled is not necessary.

This is precisely another advantage of the method according to the invention in that this carbon deposit can be omitted, thereby avoiding an additional step in the brazing method.

Advantageously, the brazing can be conducted at a brazing temperature that is at least 15° C. higher, preferably at least 30° C. higher than the melting point of the brazing composition.

For the brazing of porous brazing surfaces, for example for composite materials whose SiC surface coating is insufficiently thick, it may be useful to conduct brazing at a temperature between the liquidus and the solidus of the brazing composition to obtain a brazing composition in the semi-solid state during the brazing (temperature) plateau. The braze composition is then viscous and the infiltration thereof into the porosities can be better controlled.

Advantageously, brazing can be performed by conducting a brazing plateau at a brazing temperature from 1040° C. to 1150° C., preferably 1080° C. to 1100° C., held for a time of 1 to 150 minutes, preferably 30 to 150 minutes, more preferably 60 to 120 minutes, further preferably 90 to 120 minutes.

If at least one surface to be joined, assembled, of the parts to be assembled, joined, is porous, a brazing temperature plateau at 1040° C. to 1100° C. held for a time of 1 to 30 minutes can be applied.

In other words, for materials having surfaces to be brazed that are relatively porous, such as composite materials whose SiC coating is of insufficient thickness, it may be useful to reduce the usual brazing time which is generally of the order of 30 to 150 minutes, to a time of a few minutes namely a time of between 1 and 30 minutes for example, to avoid too much infiltration of the brazing composition into the porosities of the material to the detriment of joint filling. In this case, it is also to be noted that the lowest brazing temperatures are generally recommended to limit infiltration, namely between 1040° C. and 1100° C.

Advantageously, prior to the brazing (temperature) plateau, it is possible to observe a first plateau at a temperature generally from 950° C. to 1000° C., preferably 980° C., generally held for a time of 30 to 180 minutes, preferably 60 to 180 minutes, more preferably 90 to 180 minutes, for example 120 minutes.

Advantageously, the silicon carbide-based materials may be chosen from among pure silicon carbides such as pure α silicon carbide (α-SiC) or pure β silicon carbide (β-SiC), and from SiC-based composite materials such as composites with silicon carbide fibres and/or matrix.

More particularly, the silicon carbide-based materials may be chosen from among pressureless sintered silicon carbide ("PLS-SiC"); Si-infiltrated silicon carbide ("SiSiC" or "RBSC"); porous recrystallized silicon carbide ("RSiC"); graphite silicon ("C-SiC") composed of graphite coated with a SiC layer; SiC/SiC composites, for example with fibres or whiskers; SiC/SiC composites with self-healing matrix; C/SiC composites, for example with carbon fibres or whiskers and SiC matrix; SiC monocrystals; SiC composites with another ceramic for example $SiC/Si_3N_4$ and SiC/TiN composites.

In general, the said silicon carbide-based materials have a silicon carbide content of at least 50% by mass, preferably at least 80% by mass and more preferably of 100% by mass.

The invention also concerns the brazing compositions described above in the description of the method according to the invention.

The invention also pertains to a composition for the brazing, for example the non-reactive, moderately refractory brazing of parts made of silicon carbide-based materials, comprising a non-reactive brazing composition such as defined above and also comprising an addition, supply of a reinforcement such as defined above.

The invention further pertains to a brazing paste, slurry or suspension for the brazing, for example the non-reactive moderately refractory brazing of parts made of silicon carbide-based materials, comprising a powder of a brazing composition according to the invention such as defined above or of a composition according to the invention for the non-reactive brazing of parts such as defined above, and an organic liquid cement, binder, or an organic viscous gel.

The invention also concerns the moderately refractory joint (maximum temperature of use generally of between 950° C. and 980° C.), and the assembly comprising at least two parts made of SiC-based materials obtained using the method of the invention described above.

Other characteristics and advantages of the invention will become better apparent on reading the following description given as a non-limiting illustration and with reference to the appended drawings in which:

DETAILED DESCRIPTION OF CERTAIN ILLUSTRATIVE EMBODIMENTS

Figure 1:
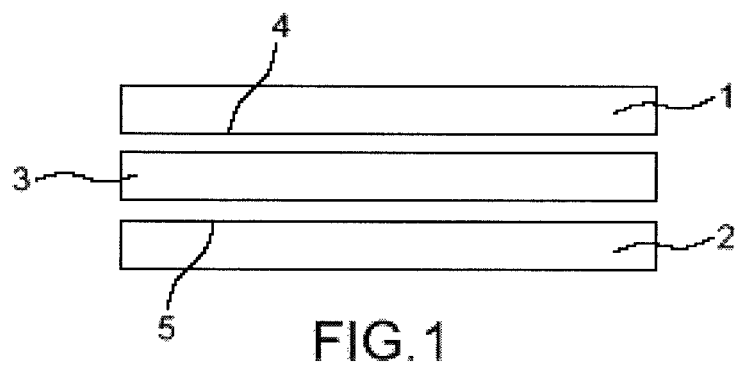
FIG. 1 is a schematic view showing the arrangement of the plates of SiC-based material and of the paste of brazing composition for brazing in <<sandwich>> configuration.

The first step of the method according to the invention generally consists of preparing, forming a braze, brazing composition, in other words a braze, brazing, alloy containing silicon, nickel and aluminium.

The braze, brazing, alloy of the invention is a ternary Silicon (Si)-Nickel (Ni)-Aluminium (Al) alloy.

The melting point of the braze alloy of the invention is generally from 1060° C. (solidus at 1030° C. and liquidus at 1060° C.). The predominant element of the alloy is silicon.

The mass proportions of the ternary Si—Ni—Al alloy, in atomic percentages, are 45% to 65% silicon, 28% to 45% nickel and 5% to 15% aluminium.

Advantageous proportions and particularly advantageous or preferred proportions were indicated in the foregoing.

The brazing composition is generally a powder composition which can be prepared, for example, by first synthesizing, from pure Si, Ni and Al elements, an intermetallic compound containing silicon, nickel and aluminium.

The synthesis of said intermetallic compound is carried out, for example, by adding silicon (e.g. in the form of pieces), nickel (e.g. in the form of pieces or other forms) and aluminium (e.g. in the form of pieces or other forms) in the desired proportions for the brazing composition, in a refractory crucible made of alumina, for example.

The assembly formed by the crucible, silicon, nickel and aluminium is placed in an heating apparatus such as a graphite furnace and is heated to a temperature generally of 1300° C., preferably under a high vacuum, for a time of 30 minutes for example, to melt the different constituents of the brazing composition and to obtain, after cooling, the final desired intermetallic compound that is homogeneous and in ingot form. The heating temperature is preferably 1300° C. for the preferred composition of the invention.

The fabrication of the ingot can also be carried out in a cold crucible. This contactless melting technique (copper crucible cooled by circulating water and placed in an inductor) allows the alloy to be melted without contacting the crucible and hence the recovery thereof without machining the crucible.

The ingot of intermetallic compound obtained is then ground using any suitable apparatus for example in a mortar to obtain a powder of adequate particle size, i.e. whose particles have a diameter of 1 to 300 μm for example, and which constitutes the brazing composition.

The second step of the method of the invention generally entails the actual joining, assembling, by brazing.

Prior to assembling, joining, the two (or more) surfaces of the parts made of SiC materials to be joined are generally degreased, cleaned in an organic solvent for example of ketone, ester, ether, alcohol type, or a mixture thereof, etc.

One preferred solvent is acetone or an acetone-ethyl alcohol-ether mixture for example in proportions of 1:3, 1:3, 1:3; it is also possible to clean the parts successively with several different solvents, for example with acetone followed by ethanol. The parts are then dried.

The parts made of SiC-based materials to be assembled are generally two in number, but it is also possible to join simultaneously a larger number of parts of possibly up to 100.

By part made of SiC-based material is generally meant any element or entity of any shape and size which, after assembly with one or more other parts, enters into structures of larger size.

According to the invention it is possible, each time with excellent results, to join parts of complex geometry, shape, and/or of large size for example having a surface area of 0.5 m² or more to be brazed.

By silicon carbide-based material is generally meant herein any materials containing at least 50% by mass of silicon carbide, preferably at least 80% by mass of silicon carbide, further preferably 100% by mass of silicon carbide; in this latter case, the material consists, is composed solely of silicon carbide.

The silicon carbide-based materials may notably be in the form of a sintered or infiltrated powder or of fibres bound by a ceramic matrix.

The silicon carbide-based materials may be chosen from among pure silicon carbides such as pure α silicon carbide (α-SiC) or pure β silicon carbide (β-SiC) and SiC-based composite materials such as composites with silicon carbide fibres and/or matrix.

As examples of SiC-based materials, mention may be made of pure dense silicon carbide or pressureless sintered silicon carbide (PLS-SiC); Si infiltrated silicon carbide (SiSiC or RBSC containing 5 to 20% Si); porous recrystallized silicon carbide (RSiC); graphite silicon (C-SiC) composed of graphite coated with a layer of SiC for example to a thickness of 0.1 to 1 mm; and SiC/SiC composites, for example with fibres or whiskers; SiC/SiC composites with self-healing matrix; C/SiC composites, for example with carbon fibres or whiskers and a SiC matrix; and also SiC monocrystals; SiC composites with another ceramic, for example $SiC/Si_3N_4$ and SiC/TiN composites.

Preferably, the silicon-based material of the substrates, parts to be joined according to the invention is composed of 100% silicon carbide chosen for example from among sintered pure α silicon carbide (α-SiC) or pure β silicon carbide (β-SiC) or from among composites with silicon carbide fibres and a silicon carbide matrix.

It has surprisingly been ascertained that the method of the invention allows the brazing of composites with excellent results (cf. Examples 4 to 6).

The two or more parts to be joined may be made of one same silicon carbide-based material for example of PLS («Pressureless Sintered»)-SiC, or of a SiC-SiC composite, or each of the parts may be made of a different silicon carbide-based material.

The suspension, paste of the brazing composition prepared as described previously is spread, coated, applied homogeneously, uniformly, using for example a brush or spatula or a syringe optionally fixed to a robotized system, or using any other means allowing a uniform layer of brazing paste to be deposited on the surface of at least one of the parts made of silicon carbide-based material to be joined.

The paste-coated surface(s) of the two parts (1, 2) to be joined are then placed in contact. This brazing configuration illustrated in FIG. 1 is called a «sandwich configuration» since the paste of brazing composition (3) is placed directly between the surfaces (4, 5) of the parts to be joined.

Preferably in this «sandwich» configuration it is recommended, for the brazing composition of the invention, that the brazing paste should not be uniformly distributed but applied in the form of beads of brazing composition, braze alloy, which do not touch each other to avoid a configuration that is too confined.

The quantity of paste, suspension of brazing composition to be used in this configuration is generally 10 mg/cm² to 50 mg/cm², for example 20 mg/cm².

The «sandwich» configuration applies both to «thin» joints i.e. having a thickness of less than 500 micrometers, and to «thick» joints i.e. having a thickness of 500 micrometers or more.

Figure 2:
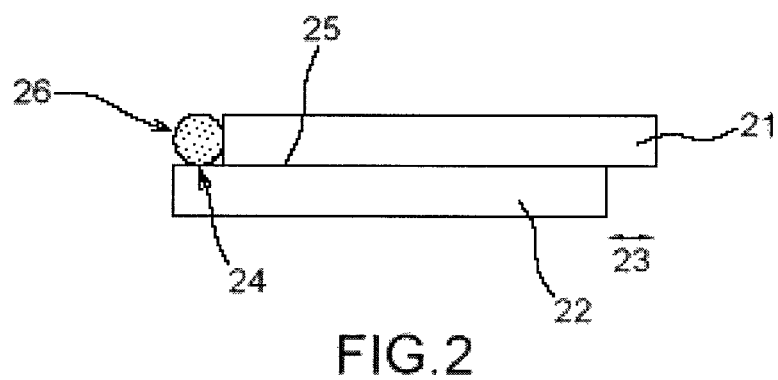
FIG. 2 is a schematic view showing the arrangement of the plates of SiC-based material and of the paste of brazing composition for brazing in capillary configuration.

Or else, as is illustrated in FIG. 2, the parts to be joined, for example in the form of plates (21, 22), are placed in contact without having put the brazing composition between them but by leaving a gap, an offset (23) therebetween generally of a few mm, for example of 1 mm, 2 mm, to 10 mm so as to create a free surface (24) able to receive the suspension or paste in the vicinity of the joint (25) formed by the surfaces to be joined, assembled, of the parts to be assembled, joined, then the suspension or paste of brazing composition is deposited for example in the form of a bead of brazing composition, braze alloy, (26) on this surface in the vicinity of the joint or on the edge of the joint. During the brazing heat cycle, the liquid brazing composition infiltrates into the joint.

This brazing configuration is called a «capillary configuration». With the brazing compositions of the invention it is possible to conduct said capillary brazing, with infiltration of the liquid brazing composition, braze alloy into the brazed joint during the brazing cycle, without depositing the brazing composition directly between the parts to be assembled as in the «sandwich» configuration.

This capillary configuration is even preferred for the Ni—Si—Al system since it allows better filling of the joint to be obtained with the brazing composition, braze.

The quantity of paste, suspension of brazing composition to be used in this capillary configuration is generally 10 mg/cm² to 30 mg/cm², for example 20 mg/cm².

Capillary brazing is possible for «thin» joints having a thickness of less than 500 μm, without reinforcements previously placed in the joint. Capillary brazing led to a good filling of the joints by the Ni—Si—Al braze alloy, the joint thickness possibly varying from a few microns to almost 500 μm for parts made of SiC/SiC composite having surface defects.

Capillary brazing is also possible for joint thicknesses much higher than 500 μm possibly reaching a few millimeters, for joints in which a «wetting reinforcement» (i.e. the braze alloy provides good wetting of the surface of the reinforcement, this being the case with SiC-based reinforcements for example) by the brazing composition has been placed between the surfaces to be brazed.

This reinforcement may be in the form of ceramic particles for example of a ceramic powder such as SiC, of fibres for example of ceramic fibres such as SiC, or C particles, of SiC fibres, of woven fibres for example of SiC, of non-woven fibres; of a felt or of a foam. The SiC powder may be a commercial powder for example such as the powder of the trade name STARCK® having a purity of 98.5% and a particle size of less than 10 μm, or the powder of trade name Neyco® having a purity of 98.5% and a particle size of 50 μm. For thicknesses higher than 500 μm, the quality of the joint is better with reinforcements of SiC particles or of SiC fibres which reduce cracks in the joint.

Regarding the nature of the reinforcement and the implementation thereof, reference can be made to the corresponding pages in the description of document [2].

The braze alloy placed on the edge of the joint changes to the liquid state during the brazing cycle, infiltrates the joint and wets the reinforcements which allows a joint to be obtained that is well filled with the braze alloy.

The reinforcements therefore allow infiltration into thick joints.

It was evidenced, in accordance with the invention, that the infiltration of the braze alloy into the joint and the wetting of the reinforcements are possible and occur optimally under certain conditions.

In other words, it was evidenced that to obtain good filling without any vacancies of braze alloy in particular in the centre of the joint, several specific steps had to be heeded.

These specific steps are the following:
first, optionally heat treatment of the reinforcement at a temperature generally from 1300° C. to 1500° C. e.g. 1400° C., under a high vacuum in a graphite furnace generally for 2 to 4 hours, before use;
after heat treatment of the reinforcement, if it is not to be used immediately, it must be stored preferably under argon;

the brazing cycle must necessarily comprise 2 plateaux as described below (see FIG. 3):

a first plateau at a temperature of 950° C. to 1000° C., for example 980° C., for a time of 2 to 4 hours, for example of 3 hours;

followed by a second plateau which is the brazing plateau such as described below and which is conducted in particular at a temperature of 1080° C. to 1100° C. for 90 to 150 minutes, for example at a temperature of 1100° C. for 90 or 120 minutes to fill typically a joint length of 3 cm of a joint composed of SiC-based reinforcements.

Figure 4:
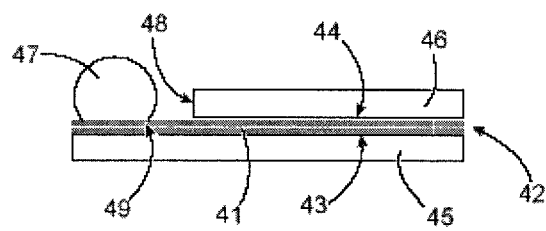
FIG. 4 is a schematic view illustrating the arrangement of the plates of SiC-based material and of the paste of brazing composition for the brazing in capillary configuration, such as especially conducted in particular in the example of a joint with a reinforcement of SiC particles or SiC fibres emerging from the joint.

It may also, optionally, be of advantage to <<bring out>> the reinforcements (41) of the joint (42) between the surfaces (43, 44) to be joined, assembled, of the parts (45, 46) to be joined, assembled in order to facilitate initiation of the infiltration of the braze alloy into the joint (42) as illustrated in FIG. 4.

This method is particularly recommended for composite materials such as CMC materials which are porous, in particular on their edges.

The brazing composition may be deposited for example in the form of a bead of braze alloy (47) distant from the edge (48) of the part (46) i.e. at a distance of 2 to 5 mm away from the edge to allow initiation by means of the reinforcements which are brought out of, emerge (49), from the joint (42) without the risk of the braze alloy infiltrating into the porosities of the composite material such as CMC.

The joint generally consists of at least 50% by volume of the Si—Ni—Al alloy, this alloy having a composition of between 60% and 55 atomic % of silicon, 30% and 34 atomic % of nickel, and 11% and 9 atomic % of aluminium, and in general at most 50% by volume of reinforcements such as ceramic particles or ceramic fibres (SiC or C for example).

The parts ready to be brazed are then arranged in a heating device such as a furnace, or subjected to heating using any other suitable means.

The furnace is generally a graphite furnace, under a vacuum or in a neutral gas atmosphere, but a metal furnace may also be used.

In general the vacuum is a high vacuum i.e. the pressure is $10^{-3}$ to $10^{-5}$ Pa, for example $10^{-4}$ Pa.

Preferably, the neutral gas is argon.

With the invention it is even possible to use argon of commercial quality (generally having 5 ppm $O_2$).

The parts to be joined are subjected to a heat cycle, in the furnace for example.

For example, the assembly formed by the parts and the brazing composition can be brought to the brazing temperature by observing a preferably <<slow>> temperature rise, with one or more temperature ramps from ambient temperature.

This temperature rise can be obtained for example using a temperature ramp of 1° C. to 5° C./minute.

The brazing plateau is generally conducted at a temperature, which is the brazing temperature, that is preferably at least 15°, more preferably at least 30° C. higher than the melting point or liquidus temperature of the chosen brazing composition, braze alloy.

For the brazing of porous surfaces to be brazed, for example for composite materials whose SiC surface coating is insufficiently thick, it may be useful to conduct brazing at a temperature between the liquidus and the solidus to obtain a braze alloy in the semi-solid state during the brazing (temperature) plateau. The braze alloy is then viscous and infiltration thereof into the porosities can be better controlled.

This brazing temperature is generally from 1040° C. to 1150° C., preferably 1080° C. to 1100° C., depending on the brazing composition and the relative proportions of Ni, Al and Si in this composition.

The melting temperature of the compositions, according to another advantage of the method of the invention, allows the use of the assembly at up to 950° C. and even up to 980° C.

Surprisingly, although the brazing temperature of the brazing compositions according to the invention is lower than 1150° C., excellent adhesion and good wetting of the silicon carbide are obtained with rapid wetting kinematics, as shown by the sessile drop tests performed with these brazing compositions, and it is therefore possible (see Example 1) to obtain a contact angle smaller than 45° after brazing for 30 minutes at 1100° C.

This excellent wetting is indispensable to achieve good quality of the formed joints, since it ensures good quality of the filling of the joint, but it does not always allow to ensure a good mechanical behaviour since this latter property is unpredictable. Yet, surprisingly, the joints prepared with the brazing compositions of the invention also have excellent mechanical properties (cf. Example 3).

The above-defined brazing temperature (1040° C. to 1150° C., preferably 1080° C. to 1100° C.), is held for a time of 1 to 150 minutes, preferably 30 to 150 minutes, more preferably 60 to 120 minutes, most preferably 90 to 120 minutes, this being called the brazing plateau.

For materials having relatively porous brazing surfaces such as composite materials, it may be useful to reduce the usual brazing time which is generally from 30 to 150 minutes, to a time of a few minutes namely a time of between 1 and 30 minutes for example, to prevent too much infiltration of the brazing composition into the porosities of the material to the detriment of filling of the joint.

The duration of the brazing plateau is dependent on the size of the parts to be joined, the thickness of the joint and more specifically on the size of the surfaces to be brazed. It is effectively possible for this duration to reach 150 even 180 minutes for very large parts having large surfaces areas to be brazed, namely typically at least 50×50 mm².

A brazing plateau for the method of the invention may for example be conducted at a brazing temperature of 1100° C. for 90 minutes.

The specific temperature of the chosen brazing plateau is a function of the composition of the braze alloy.

A homogenizing plateau at 980° C. for example is recommended even essential for large-size parts (typically on and after 50×50 mm²) to guarantee the thermal homogeneity of the parts to be joined.

It is to be noted that since the wetting kinetics are good, it is not necessary to accelerate the already excellent wetting, and this optional first temperature plateau for the Ni—Al—Si compositions of the invention is essentially even solely a homogenization plateau. This is generally valid for joints without reinforcement. On the other hand, this plateau is essential if reinforcements are pre-positioned between the surfaces to be brazed This plateau can be replaced by a slow temperature rise for example around 1000° C.

The duration of the first plateau and the duration of the brazing plateau are dependent on the size of the furnace, the size of the parts to be brazed and the tooling supporting the parts to be brazed.

This first plateau which is therefore a homogenization plateau is generally observed at a temperature of 950° C. to 1000° C., for example 980° C. for a minimum recommended time of one hour, for example a time of 90 to 180 minutes, before conducting the actual brazing plateau under the conditions already indicated above.

Both in the capillary configuration and in the <<sandwich>> configuration, the said first plateau is not indispensable for parts of small size without particle reinforcements placed in the joint.

The said first plateau is generally recommended even indispensable in both these configurations for large-size parts, namely and in general parts which have surfaces to be brazed of more than 50×50 mm$^2$, to guarantee thermal homogeneity at the parts to be joined. It is also compulsory for joints with particle reinforcements.

The duration of these (temperature) plateaus can be increased, and for example can be set at 180 minutes for the first plateau and 150 minutes for the second plateau for parts of very large size for example having a surface area of 0.5 m$^2$ or more to be brazed.

Or else thermal homogenization may be also obtained by omitting this first plateau and conducting a slow temperature rise (at the rate of 0.5° C./minute for example) generally between 900° C. and 1000° C., preferably at 980° C., so that the exposure time of the assembly in this temperature range is for example of the order of 90 to 120 minutes.

Like the first plateau, the said slow temperature rise is advisable even indispensable for large-size parts in both configurations.

On completion of the brazing cycle, after the brazing plateau, the assembly is cooled down to ambient temperature, at a rate of 5° C. or 6° C. per minute for example.

During cool-down, the braze alloy solidifies and the joining of the parts made of silicon carbide-based materials becomes effective whether a <<sandwich>> configuration or a <<capillary>> configuration is used.

The assemblies formed with the method of the invention were subjected to compression/shear tests (see FIG. 6) at ambient temperature.

For sintered SiC/NiSiAl braze alloy of the invention without reinforcement/sintered SiC joints, the mean breaking stress value obtained was 48 MPa which is an excellent result, much higher than those obtained in document [3] with a NiSi braze alloy.

For joints, substrates made of CMC composite of Cerasep A40C® type (SiC matrix, SiC fibres)/NiSiAl braze alloy of the invention without reinforcement/CMC composite, the mean breaking stress value obtained was of the order of 15 MPa, the weak point of the assembly between the braze alloy and the CMC being located at the CMC seal coat which is SiC prepared by chemical vapour deposition (CVD).

As already pointed out, this mechanical strength can be improved by adding reinforcements to the brazing composition. These reinforcements may be reinforcements of particle type for example in the form of a SiC powder, or of ceramic fibre type for example in the form of fibres alone or woven e.g. made of SiC. The reinforcement content is generally at most 50% by volume, and may generally range from one or a few % by volume e.g. 5% by volume up to 49% by volume of the brazing composition. As already indicated above, to obtain good filling of the joint by capillary brazing with reinforcements pre-positioned in the joint, it is necessary to follow a certain number of specific steps.

The assemblies of parts made of silicon carbide comprising joints prepared using the method of the invention allow to obtain structures, apparatus, components of complex shapes having high temperatures of use which may reach 950° C., even 980° C., with great precision.

It is effectively known that the properties of silicon carbide:
high hardness;
high rigidity;
low density;
low coefficient of expansion;
high breaking stress;
good resistance to heat shock;
and very good conductivity makes this material an indispensable material for present and future industrial applications, in particular at high temperature.

In addition, SiC has very good chemical resistance to various acids including hydrofluoric acid, and very good resistance to oxidation in air at high temperature of up to 1300° C.

In other words, the method of the invention can notably be applied to the manufacture of any device, apparatus, structure, component requiring moderately refractory joining between at least two substrates, parts made of silicon carbide, by guaranteeing both good mechanical strength and a satisfactory sealing, leak tightness at the joint.

This type of device, apparatus, structure, component is able to meet the needs in various fields:
the field of heat engineering, in particular for the designing of high performing heat exchangers since silicon carbide has good thermal conductivity and good resistance to high temperatures in extreme environments;
the field of mechanical engineering, to manufacture on-board devices to obtain light weight, rigid, refractory components resisting to abrasion and mechanical stresses;
the field of chemical engineering, since silicon carbide is resistant to numerous corrosive chemical products such as bases and strong acids;
the field of nuclear engineering, for the manufacturing of cladding for nuclear fuel;
the fields of spatial optics (telescope mirror in SiC) and aeronautics (parts made of SiC/SiC composite);
power electronics which use SiC substrates.

The invention will now be described using the following examples evidently given as non-limiting illustrations.

EXAMPLES

Example 1

This example describes sessile drop tests performed with a brazing composition, braze alloy of the invention of composition 58% Si, 32% Ni and 10% Al (atomic percentages) on sintered pure α-SiC, observing a single brazing plateau at 1100° C. for 30 minutes.

a) Preparation of the Brazing Composition and Brazing Paste

The brazing composition concerned: 58 atomic % Si, 32 atomic % Ni and 10 atomic % Al was prepared from pieces of pure Si, pieces of pure Ni and pieces of pure Al.

These pieces were weighed paying heed to the proportions of the brazing composition and placed in an alumina crucible. The assembly was placed in a graphite furnace and subjected to a heat cycle with a plateau at 1300° C. under a high vacuum for 30 minutes.

After cooling, this gave an ingot. This ingot was crushed to obtain a powder.

An organic binder (NICROBRAZ® cement) was added to this mixture of powders to form a viscous paste.

b) Sessile Drop Test at 1100° C.

The brazing paste thus prepared was used to form a small mound of braze alloy having a mass of approximately 50 mg. This mound of braze alloy was deposited on a previously cleaned SiC plate.

The assembly of the braze alloy mound and plate was placed in a brazing furnace and subjected to a brazing heat cycle under a high vacuum with only a single plateau which was the brazing plateau at 1100° C. for a time of 30 minutes.

The mound of braze alloy melts during this heat treatment and forms a drop that is called a "sessile drop".

After cooling the wetting, contact angle of the drop was measured on the solidified drop.

The wetting angle was of the order of 30° which corresponds to good wetting.

The SiC and its drop of solidified braze alloy were then cross-sectioned, prepared and polished and observed under scanning electron microscope.

The SiC/braze alloy interface did not show any reactivity on the scale of scanning electron microscopy i.e. there was no formation of a new compound. In particular, there was no formation of fragile compounds at the interface.

Example 2

This example describes sessile drop tests performed with a brazing composition, braze alloy of the invention having the composition 58% Si, 32% Ni and 10% Al (atomic percentage) on sintered pure α-SiC observing a single brazing plateau at 1100° C. for 5 minutes.

a) Preparation of the Brazing Composition and Brazing Paste

The brazing composition concerned i.e. 58% Si, 32% Ni and 10% Al (atomic percentages) was prepared from pieces of pure Si, pieces of pure Ni and pieces of pure Al.

These pieces were weighed paying heed to the proportions of the brazing composition and placed in an alumina crucible. The assembly was placed in a graphite furnace and subjected to a heat cycle with a plateau at 1300° C. under a high vacuum for 30 minutes.

After cooling, this gave an ingot. This ingot was crushed to obtain a powder.

An organic binder (NICROBRAZ® cement) was added to this mixture of powders to form a viscous paste.

b) Sessile Drop Test at 1100° C.

The brazing paste thus prepared was used to form a small mound of braze alloy having a mass in the order of 50 mg. This mound of braze alloy was deposited on a SiC plate that was previously cleaned.

The assembly of the mound of braze alloy and plate was placed in a brazing furnace and subjected to a brazing heat cycle under a high vacuum with a single plateau, which was the brazing plateau at 1100° C. for a time of 5 minutes.

The mound of braze alloy melts during this heat treatment and forms a so-called sessile drop.

After cooling, the wetting, contact, angle of the drop was measured on the solidified drop.

The wetting angle was of the order of 50° which corresponds to good wetting.

Example 3

This example describes the preparation of bonds, joining between two parts made of sintered pure α-SiC silicon carbide using the brazing method according to the invention, the brazing being conducted in capillary configuration using a brazing composition, braze alloy of the invention composed of 58 atomic % Si, 32 atomic % Ni and 10 atomic % aluminium.

This example also describes tests, mechanical testing performed on these assemblies.

a) Preparation of the Brazing Composition, of the Brazing Paste and of the Parts to be Assembled The brazing composition concerned, namely 58 atomic % Si, 32 atomic % Ni and 10 atomic % aluminium was prepared in the manner described in Example 1.

An organic binder (NICROBRAZ® cement) was added to the mixture of powders obtained to form a viscous brazing paste.

The parts made of sintered SiC to be assembled were plates of size 20×10 mm² and thickness of 1.5 mm.

The parts were cleaned with acetone then ethanol and finally dried.

The substrates, parts were placed in contact leaving a small offset of 1 to 2 mm, so as to leave a space for depositing the brazing paste in the vicinity of the joint (this configuration is called the capillary configuration). The paste was deposited with a spatula on the available surface on the edge of the joint, in the form of a bead of braze alloy (see FIG. 2). The quantity of braze alloy was between 20 and 40 mg for this assembly.

b) Brazing

The contacted parts ready to be brazed were placed in a brazing furnace (graphite furnace) under a high vacuum and subjected to a brazing heat cycle under a vacuum which comprised a single temperature plateau of 90 minutes at 1100° C., which was the brazing plateau.

Figure 5:
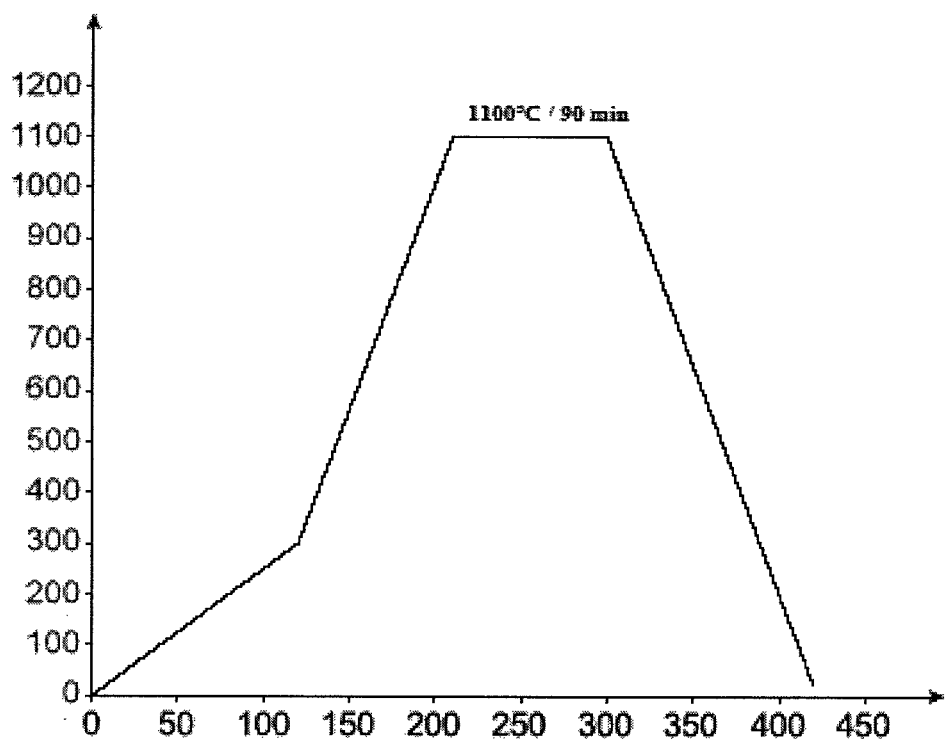
FIG. 5 is a graph illustrating the brazing heat cycle used in Example 3. The time in minutes as from the start of heat treatment is given along the X-axis, and the temperature T in ° C. is given along the Y-axis.

The heat cycle is illustrated in FIG. 5.

c) Observation of the Joint

After cooling, the assembly was well joined. The joint was characterized by scanning electron microscopy. There was no <<void>> and a reactivity between the SiC and the braze alloy was not evidenced on the scale of observation under scanning electron microscopy.

d) Preparation of Mechanical Test Pieces and Results of Mechanical Testing

Assemblies, test pieces (5 test pieces) for mechanical testing were prepared by brazing 2 parts each of size 20×10×1.5 mm³ (the thickness of the brazed test piece was therefore 1.5+1.5=3 mm) (61, 62) with the brazing paste prepared at a) above and under the brazing conditions described at b) above. Since the mechanics of ceramics are statistical, more than one test piece was prepared for testing but following the same method of fabrication.

Figure 6:
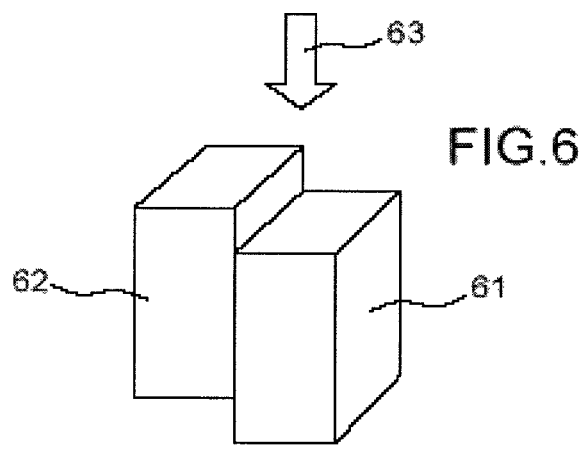
FIG. 6 is a schematic view of the test pieces used for mechanical testing, in particular compression/shear testing of the joints and the assemblies prepared in the Examples.

The test pieces are schematized in FIG. 6. They were held on a mount and subjected to shearing during a compression/shear test (63) at ambient temperature.

It is to be noted that this test does not allow the guaranteeing of pure shear but it is the preferred mode. However this test does allow a comparison between the assemblies.

Results of the Mechanical Tests

The breaking stresses determined for each of the 5 test pieces were 33 MPa; 67 MPa; 35 MPa; 53 MPa and 54 MPa i.e. a mean of 48 MPa.

Breaking occurred in the SiC, which is characteristic of strong bonds between the braze alloy and the substrate in SiC.

It is to be noted that the breaking stress values of joints, assemblies of the type SiC/braze alloy with high Si content/SiC can be more or less dispersed on account of the fragile nature of ceramic materials.

Example 4

This example describes the preparation of bonds, joining between two parts made of CMC, more specifically made of SiC/SiC composite with a SiC matrix and SiC fibres, using the brazing method of the invention, the brazing being conducted in capillary configuration using a brazing composition, braze alloy of the invention composed of 58 atomic % Si, 32 atomic % Ni and 10 atomic % aluminium.

This example also describes mechanical tests performed on these assemblies.

a) Preparation of the Brazing Composition, of the Brazing Paste and of the Parts to be Joined The brazing composition concerned, namely 58 atomic % Si, 32 atomic % Ni and 10% aluminium was prepared in the manner described in Example 1.

An organic binder (NICROBRAZ® cement) was added to the mixture of powders obtained to form a viscous brazing paste.

The parts, substrates to be brazed, joined were plates of SiC/SiC composite with a SiC matrix and SiC fibres. The said composite material is available from Snecma Propulsion Solide under the trade name Cerasep A40C®. These plates were of size 20×10 mm$^2$ and of thickness 1.5 mm.

The parts were cleaned with acetone then ethanol and finally dried.

The substrates, parts were placed in contact leaving a small offset of 3 mm, so as to leave a space for depositing the brazing paste in the vicinity of the joint (this configuration is called the capillary configuration). The paste was deposited with a spatula on the free surface at the edge of the joint, in the form of a bead of braze alloy (see FIG. 2), as described in Example 2. The quantity of deposited braze alloy was between 180 and 200 mg for this assembly.

This quantity of braze alloy is much higher than in Example 2 since the clearance between the plates made of CMC was much greater than for the plates of sintered SiC in Example 2.

For example the thickness of the joint may reach 500 μm for the CMC plates on account of the planarity defects, whereas it is generally less than 100 μm for the SiC plates.

b) Brazing

The parts placed in contact and ready to be brazed were placed in a brazing furnace (graphite furnace) under a high vacuum and subjected to a vacuum brazing heat cycle which, as for Example 2, comprised a single plateau for 90 minutes at 1100° C., which was the brazing plateau.

The heat cycle is illustrated in FIG. 5.

c) Observation of the Joint

After cooling, the assembly was well joined. The joint was characterized under scanning electron microscopy. There was no <<void>>, and no reactivity between the SiC and the braze alloy was evidenced on the scale of observation under scanning electron microscopy.

The thickness of the joint was between 100 and 500 μm depending on the observed zones owing to local coating defects of the CMC and planarity defects.

d) Preparation of Mechanical Test Pieces and Results of Mechanical Tests

Assemblies, test pieces (4 test pieces) for mechanical testing were prepared by brazing 2 parts each of size 20×10×1.5 mm$^3$ with the brazing paste prepared at a) above and under the brazing conditions described at b) above.

The test pieces were of similar size to those in Example 2 and were similarly tested under compression/shear.

Results of the Mechanical Tests:

The breaking stresses determined for each of the 4 test pieces were 14 MPa; 12 MPa; 13 MPa and 20 MPa i.e. a mean of about 15 MPa.

For three test pieces, yield occurred by detachment of the SiC coating "seal coat" from the CMC. This coating therefore proves to be the weak point of the CMC/braze alloy/CMC assembly.

For the fourth test piece, the measured stress corresponded to the onset of degradation of the composite.

Example 5

This example describes the preparation of bonds, joining, assemblies, between two parts made of CMC, more specifically made of SiC/SiC composite with SiC matrix and SiC fibres, using the brazing method of the invention, brazing being conducted in capillary configuration using a brazing composition, braze alloy of the invention composed of 58 atomic % Si, 32 atomic % Ni and 10 atomic % aluminium and reinforcements of SiC particles not heat treated at 1400° C.

This example further describes tests, mechanical testing conducted on these assemblies.

a) Preparation of the Brazing Composition, of the Brazing Paste and of the Parts to be Joined The brazing composition concerned, namely 58 atomic % Si, 32 atomic % Ni and 10 atomic % aluminium was prepared in the manner described in Example 1.

An organic binder (NICROBRAZ® cement) was added to the mixture of powders to form a viscous brazing paste.

The parts, substrates to be brazed were plates (71, 72) made of SiC/SiC composite with a SiC matrix and SiC fibres. Said composite material is available from Snecma Propulsion Solide under the trade name Cerasep A40C®. These plates (71, 72) were of size 20×10 mm$^2$ with a thickness of 1.5 mm.

The parts (71, 72) were cleaned with acetone followed by ethanol and then dried.

The plates (71, 72) were coated with SiC particles of particle size 50 μm. These particles were not heat treated at 1400° C.

Figure 7:
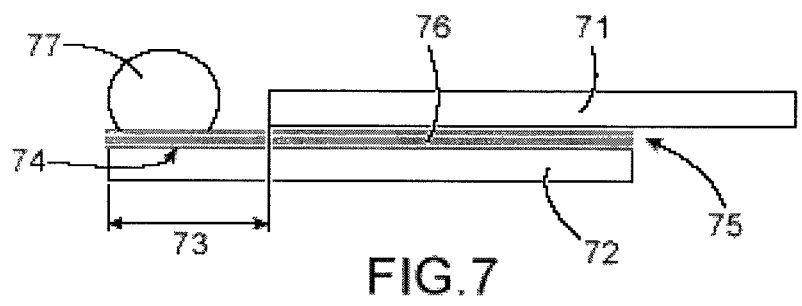
FIG. 7 is a schematic view illustrating the arrangement of the plates of SiC-based material and of the paste of brazing composition for the brazing in capillary configuration, such as conducted in Example 5, of a joint with a reinforcement of SiC particles or SiC fibres emerging from the joint.

For depositing on the composite plates, the SiC particles were bonded together using an organic binder such as a cement of NICROBRAZ® type, which allows the obtaining of a paste easy to deposit on the CMC plates. Depositing was carried out as indicated in FIG. 7 and the amount of deposited particles was 87 mg±1 mg.

The plates of CMC (71, 72) were then contacted leaving a small offset (73) of 3 mm so as to leave a space (74) to deposit the brazing paste in the vicinity of the joint (75) (this configuration is called a capillary configuration).

The joint (75) was filled with the paste of SiC reinforcement particles (76) which projected beyond the joint (75) over the available, free, surface (74) offset from the lower plate (72).

The paste of brazing composition (77) was deposited using a spatula over the available surface (74) at the edge of the joint, in the form of a bead of braze alloy (77) (see FIG. 7), as described in Example 2. The amount of braze alloy deposited was between 195 and 220 mg for this assembly.

This amount of braze alloy was much higher than in Example 2 since the clearance between the CMC plates was much greater than between the plates of sintered SiC in Example 2.

For example, the thickness of the joint may reach 700 μm for CMC plates owing to planarity defects whereas it is generally less than 100 μm for SiC plates.

b) Brazing

The parts placed in contact and ready to be brazed were placed in a brazing furnace (graphite furnace) under a high vacuum and subjected to a vacuum heat cycle which, as for Example 2, comprised a single plateau of 90 minutes at 1100° C., which was the brazing plateau.

The heat cycle is illustrated in FIG. 5.

c) Preparation of the Mechanical Test Pieces and Results of Mechanical Testing

Assemblies, test pieces (5 test pieces) for mechanical testing were prepared by brazing 2 parts each of size 20×10×1.5 mm$^3$ with the brazing paste prepared at a) above with the coating of SiC particles described above, and under the brazing conditions described at b) above.

The test pieces were of similar size to those in Example 2 and were tested in the same manner under compression/shear.

Results of Mechanical Tests:

The breaking stresses determined for each of the 5 test pieces were 13 MPa; 15 MPa; 14 MPa; 11 MPa and 22 MPa i.e. a mean of 15 MPa.

For four test pieces breaking occurred by detachment of the SiC coating "seal coat" from the CMC. This coating therefore proves to be the weak point of the CMC/braze alloy/CMC assembly.

For the fifth test piece, the measured stress corresponded to the onset of degradation of the composite.

After these tests, the test pieces were cross-sectioned. A lack of braze alloy was observed in the centre of the test pieces.

d) Observation of the Joints

After the mechanical tests, the test pieces were cross-sectioned. A lack of braze alloy was observed (under SEM, but also visually) in the centre of the test pieces.

The thickness of the joint was between 100 and 700 μm depending on the zones observed owing to local defects of the CMC coating and planarity defects.

Example 6

This example describes the preparation of bonds, joining, assemblies, between two parts made of CMC, more specifically made of SiC/SiC composite with a SiC matrix and SiC fibres, using a brazing method of the invention, brazing being conducted in capillary configuration using a brazing composition, braze alloy of the invention composed of 58 atomic % Si, 32 atomic % Ni and 10 atomic % aluminium, and SiC particle reinforcements that were heat treated at 1460° C.

a) Preparation of the Brazing Composition, of the Brazing Paste and of the Parts to be Joined The brazing composition concerned, namely 58 atomic % Si, 32 atomic % Ni and 10 atomic % aluminium was prepared in the manner described in Example 1.

An organic binder (NICROBRAZ® cement) was added to the mixture of powders obtained to form a viscous brazing paste.

The parts, substrates to be brazed, assembled were two plates made of SiC/SiC composite with a SiC matrix and SiC fibres. Said composite material is available from Snecma Propulsion Solide under the trade name Cerasep A40C®.

The size of these plates was respectively 20×30 mm$^2$ and 20×40 mm$^2$ and they each had a thickness of 1.5 mm.

The parts were cleaned with acetone followed by ethanol and then dried.

The plates were coated with SiC particles of particle size 50 μm.

These particles were heat treated at 1460° C. under a high vacuum for two hours. After this heat treatment, the SiC particles were stored under argon until use.

For depositing on the composite plates, the SiC particles were bonded together with an organic binder such as a cement of NICROBRAZ® type, which allows the obtaining of a paste easy to deposit on the CMC plates. Depositing was carried out as indicated in FIG. 4, and the quantity of deposited particles was 194 mg±1 mg, this quantity being distributed between the two plates.

The CMC plates were then placed in contact leaving a slight offset of 3 mm so as to leave a space for depositing the brazing paste in the vicinity of the joint (this configuration is called a capillary configuration).

The joint (42) was filled with the paste of SiC reinforcing particles (41) which projected beyond the joint (42) over the available surface, offset from the lower plate (45).

The paste was deposited with a spatula over the available surface at the edge of the joint, in the form of a bead of braze alloy (47) (see FIG. 4), as described in Example 2. The quantity of deposited braze alloy was 1280 mg for this assembly.

This amount of paste is high since there was a large clearance between the CMC plates.

b) Brazing

Figure 3:
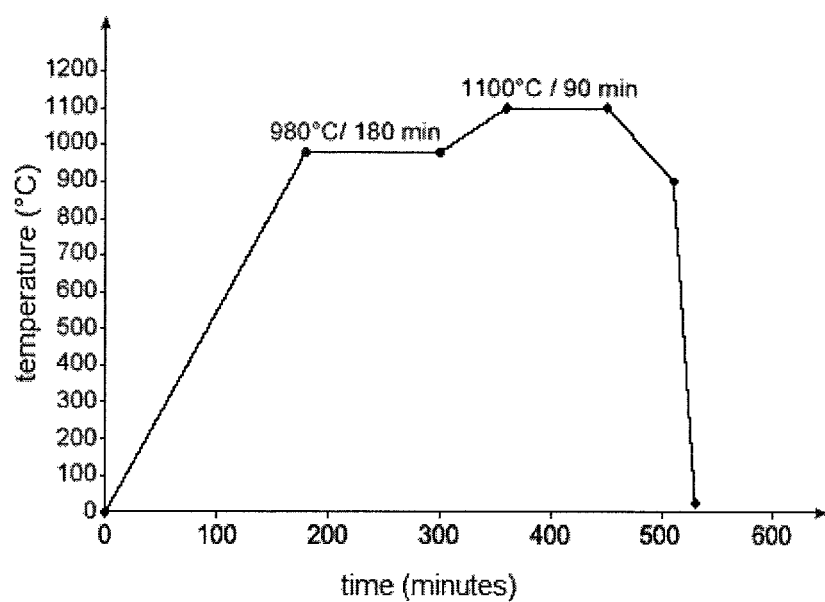
FIG. 3 is a graph illustrating the brazing heat cycle recommended for brazing a joint with a reinforcement of SiC particles or SiC fibres which is also the brazing heat cycle used in Example 6. The time in minutes as from the start of heat treatment is given along the X-axis, and the temperature T in ° C. is given along the Y-axis.

The parts placed in contact and ready to be brazed were placed in a brazing furnace (graphite furnace) under a high vacuum and subjected to a vacuum brazing heat cycle which comprised two temperature plateaus, namely:

a first plateau at 980° C. for 180 minutes, a second plateau at 1100° C. for 90 minutes. The heat cycle is illustrated in FIG. 3.

c) Observation of the Joints

The assembly thus prepared after step b) was cross-sectioned and characterized under scanning electron microscopy.

The joint was fully filled with the braze alloy, even in the centre.

This example shows that filling of the centre of the joint is controlled in the presence of reinforcement.

REFERENCES

[1] Gasse A., Coing-Boyat G., Bourgeois G., "Method using a thick joint for joining parts in SiC-based materials by refractory brazing and refractory thick joint thus obtained", U.S. Pat. No. 5,975,407, 1999.

[2] Gasse A., "Method for assembling parts made of materials based on SiC by non-reactive refractory brazing, brazing composition, and joint and assembly obtained by said method", Patent application US-A1-2003/0038166.

[3] Heap H., "Method of Brazing", U.S. Pat. No. 3,813,759, 1974.

[4] S. Kalogeropoulou, L. Baud, N. Eustathopoulos., "*Relationship between wettability and reactivity*", Acta. Metall. Mater., Vol. 43, N° 3, pp. 907-912, 1995.

[5] C. Rado, S. Kalogeropoulou, N. Eustathopoulos., "*Wetting and bonding of Ni—Si alloys on silicon carbide*", Acta. Metall. Mater., Vol. 47, N° 2, pp. 461-473, 1999.

[6] J. R. Mc Dermid, R. A. L. Drew., "*Thermodynamic brazing alloy design for joining silicon carbide*", J. Am. Ceram. Soc., Vol. 74, N° 8, pp. 1855-1860, 1991.

[7] Montgomery F. C., Streckert H. H., Braze for Silicon Carbide bodies, U.S. Pat. No. 5,447,683, 1995.

What is claimed is:

1. A refractory joint joining parts comprising silicon carbide-based materials and formed by non-reactive brazing of a non-reactive brazing composition which is a ternary alloy consisting of, in atomic percentages, 45% to 65% silicon, 28% to 45% nickel and 5% to 15% aluminium, the joint having substantially the same composition as the non-reactive brazing composition.

2. The refractory joint according to claim 1, wherein said non-reactive brazing composition consists of, in atomic percentages, 55% to 60% silicon, 30% to 34% nickel and 9% to 11% aluminium.

3. The refractory joint according to claim 1, wherein said non-reactive brazing composition consists of, in atomic percentages, 57.5±1% silicon, 32.5±1% nickel and 10±0.5% aluminium.

4. The refractory joint according to claim 1, wherein the refractory joint further comprises a reinforcement.

5. The refractory joint according to claim 4, wherein the reinforcement comprises ceramics.

6. The refractory joint according to claim 4, wherein the reinforcement is in form of particles, of fibres, of a non-woven fabric of fibres, of a woven fabric of fibres, of a felt, or of a foam.

7. The refractory joint according to claim 4, wherein the reinforcement is at most 50% by volume relative to a total volume of the non-reactive brazing composition.

8. The refractory joint according to claim 1, wherein said refractory joint is capable of withstanding a temperature up to 980° C.

9. The refractory joint according to claim 1, wherein the refractory joint is formed by capillary brazing of the non-reactive brazing composition and therefore substantially fills pores present on the parts.

10. An assembly comprising:
at least two parts comprising silicon carbide-based materials; and
the refractory joint according to claim 1 joining said at least two parts.

11. The assembly according to claim 10, wherein the silicon carbide-based materials are selected from the group consisting of pure silicon carbide and composite SiC-based materials.

12. The assembly according to claim 10, wherein the silicon carbide-based materials are selected from the group consisting of sintered pressureless silicon carbide ("PLS SiC"), Si infiltrated silicon carbide ("SiSiC" or "RBSC"), porous recrystallized silicon carbide ("RSiC"), graphite silicon ("C SiC") composed of graphite coated with a SiC layer, SiC/SiC composites, SiC/SiC composites with self-healing matrix, C/SiC composites, SiC monocrystals, and SiC composites with another ceramic.

13. The assembly according to claim 10, wherein the silicon carbide-based materials comprise a silicon carbide content of at least 50% by mass relative to a total mass of the silicon carbide-based materials.

14. The assembly according to claim 10, wherein said non-reactive brazing composition consists of, in atomic percentages, 55% to 60% silicon, 30% to 34% nickel and 9% to 11% aluminium.

15. The assembly according to claim 10, wherein said brazing composition consists of, in atomic percentages, 57.5±1% silicon, 32.5±1% nickel and 10±0.5% aluminium.

16. The assembly according to claim 10, wherein the assembly further comprises a reinforcement.

17. The assembly according to claim 16, wherein the reinforcement comprises ceramics.

18. The assembly according to claim 16, wherein the reinforcement is in form of particles, of fibres, of a non-woven fabric of fibres, of a woven fabric of fibres, of a felt, or of a foam.

19. The assembly according to claim 16, wherein the reinforcement is at most 50% by volume relative to a total volume of the non-reactive brazing composition.

20. The refractory joint according to claim 1, wherein said refractory joint comprises, in atomic percentages, 55% to 60% silicon, 30% to 34% nickel and 9% to 11% aluminium.

21. The refractory joint according to claim 1, wherein said refractory joint comprises, in atomic percentages, 57.5±1% silicon, 32.5±1% nickel and 10±0.5% aluminium.

22. The assembly according to claim 10, wherein said refractory joint comprises, in atomic percentages, 55% to 60% silicon, 30% to 34% nickel and 9% to 11% aluminium.

23. The assembly according to claim 10, wherein said refractory joint comprises, in atomic percentages, 57.5±1% silicon, 32.5±1% nickel and 10±0.5% aluminium.

24. An assembly comprising at least two substrates made of silicon carbide-based material and a the non-reactive brazing composition which is a ternary alloy consisting of, in atomic percentages, 45% to 65% silicon, 28% to 45% nickel and 5% to 15% aluminium, wherein the at least two substrates respectively comprises silicon carbide by at least 50% relative to total amount of the substrate by mass.

25. The assembly of claim 24, wherein the at least two substrates respectively comprises silicon carbide by at least 80% relative to total amount of the substrate by mass.

26. The assembly of claim 24, wherein the non-reactive brazing composition consists of, in atomic percentages, 55% to 60% silicon, 30% to 34% nickel and 9% to 11% aluminium.

27. A method of producing an assembly comprising at least two substrates made of silicon carbide-based material and a non-reactive brazing composition which is a ternary alloy consisting of, in atomic percentages, 45% to 65% silicon, 28% to 45% nickel and 5% to 15% aluminium comprising,
heating the assembly at temperature of 1150° C. or lower, and
forming a refractory joint between the two substrates by cooling the assembly.

28. The method of producing the assembly of claim 27, further comprising;
disposing the non-reactive brazing composition between the two substrates before heating the assembly.

29. The method of producing the assembly of claim 27, wherein the temperature of heating the assembly is in a range from 1040 to 1150° C.

30. The method of producing the assembly of claim 27, wherein the temperature of heating the assembly is in a range from 1080 to 1100° C.

31. The method of producing the assembly of claim 27, wherein time period of the heating is from 30 to 150 minutes.

32. The method of producing the assembly of claim 27, further comprising;
heating the assembly at temperature of 950 to 1000° C. before heating the assembly at temperature of 1150° C. or lower.

33. The method of producing the assembly of claim 32, wherein time period of the heating at temperature of 950 to 1000° C. is from 30 to 180 minutes.

34. The method of producing the assembly of claim 27, wherein the substrate comprises silicon carbide by at least 50% relative to total amount of the substrate by mass.

35. The method of producing the assembly of claim 27, wherein the substrate comprises silicon carbide by at least 80% relative to total amount of the substrate by mass.

36. The refractory joint joining parts of claim 1, wherein a temperature for brazing the non-reactive brazing composition is equal to or lower than 1150° C.

37. The assembly of claim 10, wherein a temperature for brazing the non-reactive brazing composition is equal to or lower than 1150° C.

38. The assembly of claim 24, wherein a temperature for brazing the non-reactive brazing composition is equal to or lower than 1150° C.

* * * * *